United States Patent [19]
Lewis, Jr. et al.

[11] Patent Number: 5,165,624
[45] Date of Patent: Nov. 24, 1992

[54] APPARATUS FOR PREROTATING AIRCRAFT WHEELS EMPLOYING FORCED AIR AND A VACUUM

[75] Inventors: Guy C. Lewis, Jr., 41 Poplar Cir., Gulfport, Miss. 39507; George P. Hopkins, Jr., Gulfport, Miss.; Carroll K. Gordon, Bay St. Louis, Miss.

[73] Assignee: Guy C. Lewis, Jr., Gulfport, Miss.

[21] Appl. No.: 788,600

[22] Filed: Nov. 6, 1991

[51] Int. Cl.⁵ .............................................. B64C 25/32
[52] U.S. Cl. .................................................. 244/103 S
[58] Field of Search ........................ 244/103 S, 103 R

[56] References Cited
U.S. PATENT DOCUMENTS

| | | | |
|---|---|---|---|
| 2,386,301 | 10/1945 | Duke et al. | 244/103 S |
| 2,435,827 | 2/1948 | Greubel | 244/103 S |
| 2,466,568 | 4/1949 | Bean | 244/103 S |
| 2,665,087 | 1/1954 | Clover | 244/103 S |
| 3,773,283 | 11/1973 | Abplanalp | 244/103 S |
| 3,814,354 | 6/1974 | Reese | 244/103 S |
| 3,850,389 | 11/1974 | Dixon | 244/103 S |
| 3,866,860 | 2/1975 | Opitz, Sr. | 244/103 S |
| 4,040,582 | 8/1977 | Krauss | 244/103 S |
| 4,061,294 | 12/1977 | Hawkins | 244/103 S |
| 4,205,812 | 6/1980 | McSweeney | 244/103 S |
| 4,385,739 | 5/1983 | Soderberg | 244/103 S |
| 4,491,288 | 1/1985 | Sinclair | 244/103 S |
| 4,615,498 | 10/1986 | Ochiai | 244/103 S |
| 4,659,039 | 4/1987 | Valdes | 244/103 S |
| 4,659,040 | 4/1987 | Sinclair | 244/103 S |
| 4,732,350 | 3/1988 | Lamont | 244/103 S |

OTHER PUBLICATIONS

Miscellaneous Patent Abstracts prepared by Dialog Information Systems (13).

*Primary Examiner*—Joseph F. Peters, Jr.
*Assistant Examiner*—Christopher P. Ellis
*Attorney, Agent, or Firm*—Banner, Birch, McKie & Beckett

[57] ABSTRACT

An apparatus and control system for prerotating the landing gear wheels of an airplane is disclosed. The apparatus includes an impeller disc attached to the rim of the wheel. The disc includes a plurality of blades. A housing covers the upper half of the impeller disc and is attached to the landing gear strut. A vacuum source is linked to one hole in the housing, and a forced air source is linked to a diametrically opposite hole. The vacuum source creates an entering stream of air which impacts on the blades creating a torque which rotates the impeller disc and wheel. Additionally, the forced air stream impacts directly on the blades to provide an additional torque. Finally, since only the lower part of the impeller disc and the associated portion of blades are exposed to the passing air stream, a third torque is created. A control system opens and closes a control valve to supply the appropriate amount of air to the impeller blades to thereby match the rotational speed of the wheels with the speed of the plane at touch down. Alternatively, hydraulic or electric motors may replace the air driven impeller system.

19 Claims, 3 Drawing Sheets

APPARATUS FOR PREROTATING AIRCRAFT WHEELS EMPLOYING FORCED AIR AND A VACUUM

BACKGROUND OF THE INVENTION

1. Technical Field

The present invention is directed to aircraft landing gear, and more particularly to an improved apparatus for pre-rotating aircraft wheels prior to landing, i.e., rotating the wheels so that at touchdown the tangential speed of the wheels closely matches the speed of the aircraft thereby reducing wear on the tires and simultaneously reducing torque on the landing gear typically due to unequal wheel speed at touchdown.

2. The Prior Art

In a typical commercial airliner, a large degree of wear and tear is experienced by the landing gear tires during each landing. In general, the tires must be inspected for excessive wear and tear after about 350 landings. The inspections are time consuming and expensive for the airlines. Moreover, when excessive wear and tear is evident, the tires must be recapped or replaced, increasing the expense.

U.S. Pat. No. 4,385,739, to Soderberg discloses a system for pre-rotating the wheels of an aircraft. A mechanical housing is affixed at the center of the wheels and contains a plurality of blades symmetrically positioned about a central axis. A nozzle is disposed so as to direct a stream of air at the blades prior to landing, thereby causing rotational movement of the housing and wheel.

U.S. Pat. No. 4,615,498 to Ochiai discloses a wheel and tire for an aircraft which includes a plurality of equiangularly spaced wind receiving ledges attached to the wheel. The ledges are disposed such that as the wheel moves through the air, the contact of the wind on the ledges causes the wheel and tire to be pre-rotated before the airplane lands.

U.S. Pat. No. 3,866,860 to Opitz, Sr. discloses a housing that covers more than 50% of the upper part of an aircraft wheel. The housing has a frontal air shroud with a center web portion spanning the width of the tire, and having flanges on either side. The shroud compresses the air and directs the passing air to the exposed lower half of the wheel. The air stream exerts a torque on the wheel, causing it to spin in the direction in which the airplane is travelling.

U.S. Pat. No. 4,061,294 to Hawkins discloses an aircraft wheel rotator including a plow like air collector which directs the passing air towards the spokes of the wheel, causing the wheel to rotate.

SUMMARY OF THE INVENTION

The preferred embodiments are directed to a prerotation device for an aircraft wheel. The device includes an impeller disc fixed to the rim of each wheel. The impeller disc includes a plurality of blades projecting therefrom. A housing is disposed over the impeller disc and includes at least one hole therein. A vacuum produces a stream of air flowing into the hole. The stream of air impacts on the blades before it enters the hole, causing rotation of the impeller disc, thereby rotating the wheel. The housing includes a second hole, and a source which provides a stream of air exiting through the second hole and impacting on the blades to provide prerotation of the wheel. Air flow through one or both of the holes is controlled by a variable flow valve in a manner that allows the wheel speed, measured by a standard tachometer to match the ground speed of the aircraft. Ground speed signals are obtained from the aircraft avionic instruments or from a self contained sensor mounted as part of the preferred embodiments. Further preferred embodiments incorporated hydraulic or electric motors to rotate the wheels in response to the wheel speed indicator and the ground speed indicator. The preferred embodiments provide the advantage of reduced wear and tear on the tires of the landing gear and simultaneously reducing torque on the aircraft landing gear typically due to unequal wheel speed at touchdown.

This invention will be more fully understood from the detailed description of the preferred embodiments of this invention with reference to the drawings.

DETAILED DESCRIPTION OF THE PREFERRED EMBODIMENTS

Figure 1:
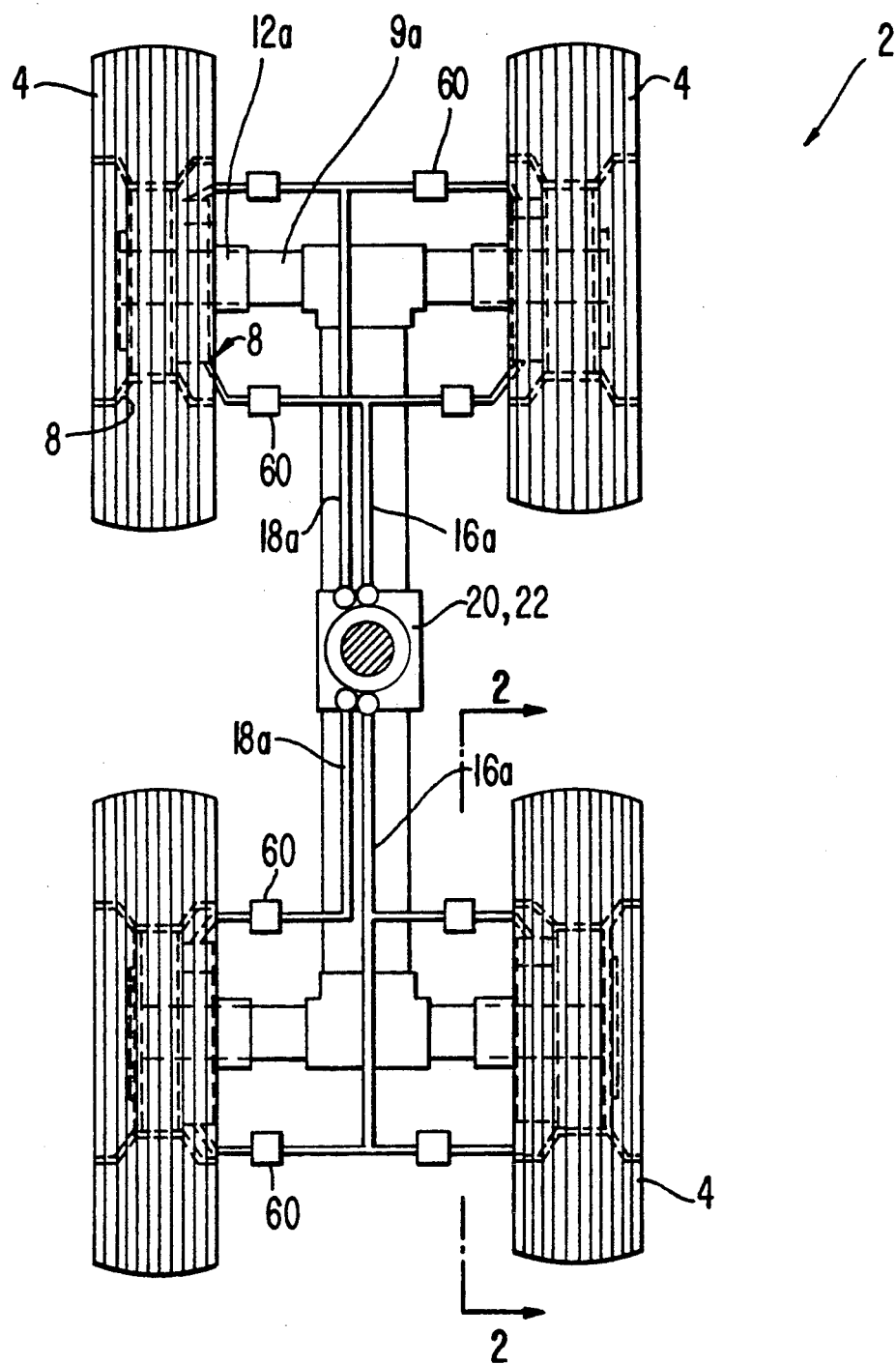
FIG. 1 is a plan view of the landing gear of an aircraft including the prerotation system of a preferred embodiment.
Figure 3:
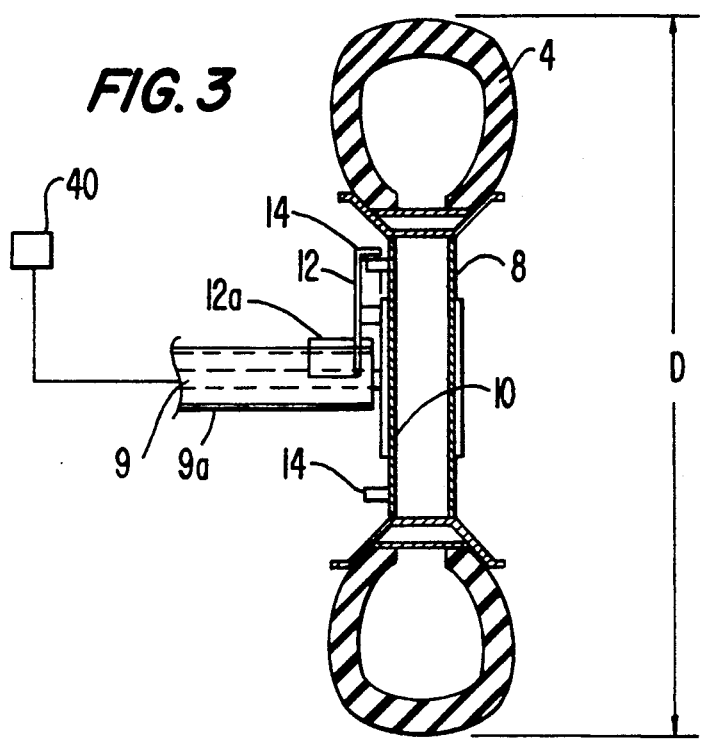
FIG. 3 is a cross-section taken along line 3—3 of FIG. 2.
Figure 2:
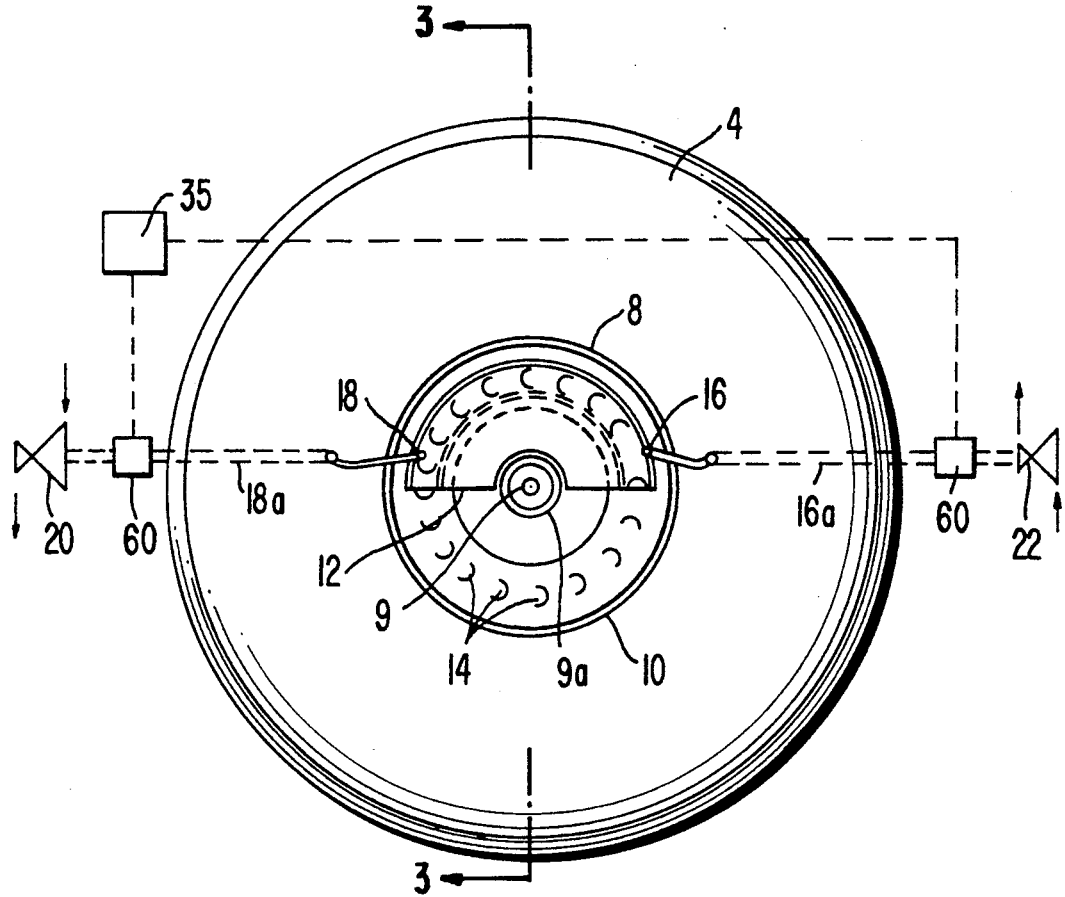
FIG. 2 is an elevational side view of one wheel of the landing gear shown in FIG. 1, including the prerotation system.

With reference to FIGS. 1-3, an arrangement for prerotating aircraft wheels according to a preferred embodiment is shown. Landing gear 2 includes a plurality of wheels 4, each wheel having a tire disposed about metal rim 8. The prerotation system includes impeller disc 10 which is securely attached on one surface of metal rim 8 of landing gear 2. Landing gear 2 also includes strut 9a disposed about each axle 9 and extending near rim 8. Each impeller disc 10 includes a plurality of turbine impeller blades 14 disposed at equiangular intervals about the perimeter on the exposed face. Blades 14 may be of any suitable shape for receiving the wind and moving in response to an air current, for example, they may be semi-circular as shown. A complete prerotation system is disposed on each wheel 4 of landing gear 2.

With particular reference to FIGS. 2-3, the prerotation system also includes impeller housing 12 disposed on each strut 9a of landing gear 2 at 12a. Housing 12 is preferably semi-circular in shape and extends inwardly towards each disc 10, so as to cover approximately the upper half of the surface area of each disc 10. Housing 12 is shaped as a hollow half disc having one open surface disposed closely adjacent the surface of disc 10. Consequently, the air from the exterior stream is precluded from contacting the blades 14 covered by impeller housing 12 as the wheel 4 moves through the air. Since housing 12 is disposed so as to cover the upper portion of disc 10, only a portion of blades 14 are covered at any given time. For example, about one half of the blades 14 may be covered such that the lower half of the blades 14 are exposed to the flow of air as the plane moves when the landing gear 2 are lowered.

Housing 12 includes forced positive air outlet hole 16 and vacuum negative air inlet hole 18 disposed at diametrically opposite locations near the bottom surface of housing 12. Appropriate tubing 16a is disposed through outlet 16, linking outlet 16 to external source of air 22 which provides a positive forced air stream to the interior of disc housing 12. Similarly, appropriate tubing 18a links inlet 18 to external vacuum system 20 which provides a negative suction air stream at the rear surface of impeller blades 14. Vacuum system 20 and air source 22 may be of any known and suitable type, for example, air source 22 may include high velocity air from air intakes in the leading edge of the wings or from the airplane compressors. Vacuum system 20 may include any suitable vacuum pump. In FIG. 1, vacuum system 20 and air source 22 are shown mounted on the landing gear, midway between the front and rear wheels, but may be mounted at any suitable location depending on their structure.

Figure 4:
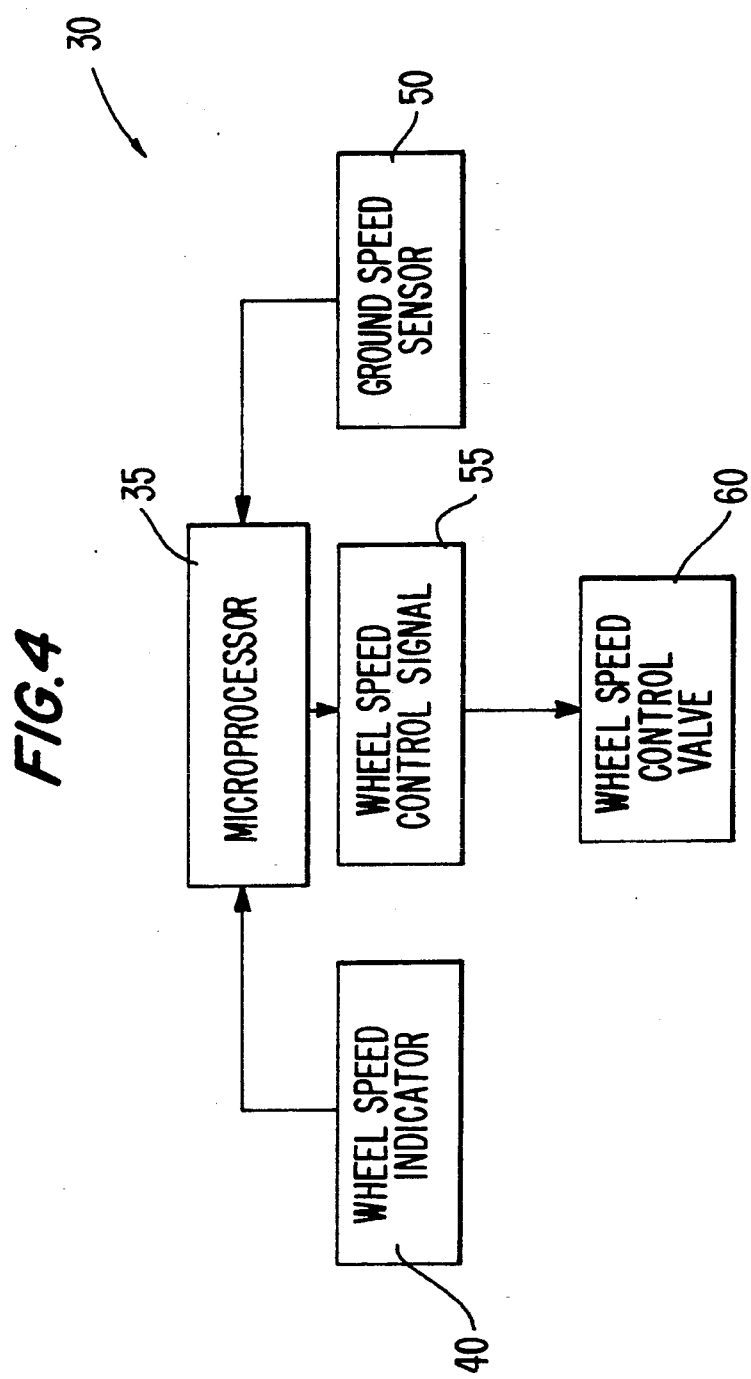
FIG. 4 is a schematic of a signal processing system used to prerotate the aircraft wheels according to the preferred embodiments.

With reference to FIG. 4 in conjunction with FIGS. 1–3, there is shown a schematic of a microprocessor unit 30 which controls the flow of air to bring the wheels 4 to substantially the same rotational velocity as the touch down speed of the aircraft. A wheel speed indicator such as a standard industrial tachometer 40 well known to those skilled in the art is mounted on the axle 9 of each wheel 4, and measures the rotational speed of each wheel 4. The rotational speed signal of wheels 4 is converted in microprocessor 35 to a signal proportional to the tangential speed of the tire by electronic means which are well known to those skilled in the art. This conversion is determined by calibrating the tachometer 30 to account for the diameter D of the tire. A ground speed sensor 50, preferably a radar type sensor such as that used in current highway traffic control systems, sends appropriate aircraft velocity signals to microprocessor 35. Alternatively, sensor 50 can be such as that provided in the on board avionics or a geomagnetic sensor as described in U.S. Pat. No. 4,509,131 to Kransnjanski which is hereby incorporated by reference.

A standard microprocessor well known to those skilled in the art is preferably used. For example, microprocessor 35 accepts signals from tachometer 40 and ground speed indicators 50, and conditions the signals for input into a computer logic system. Microprocessor 35 then provides a wheel speed control signal 55 to a control valve 60 such as a solenoid control valve having a specified duty ratio. Wheel speed control signal 55 opens and closes control valve 60 whereupon the appropriate amount of forced air and/or vacuum air is supplied to the impeller blades 14. Control valves 60 are preferably provided in both the forced air flow path 16a and in the suction flow path 18a. Alternatively, especially in larger aircraft applications, a single control valve 60 may be used to control both the positive 16a and negative air streams 18a for greater torque control.

The electronically driven control valve 60 adjusts the air stream impinging on impeller blades 14 thereby closely matching the tangential velocity of the wheel 4 to the aircraft touch down speed. The natural air stream over the impeller blades 14 not covered by impeller housing 12 and the flow through the positive forced air flow hole 16 in the impeller housing 12 are adequate to bring the wheel speed up to a rotational speed such that the tangential wheel speed closely matches the ground speed. Thus, hole 18 associated with the negative suction air stream provides additional wheel speed control. In addition to providing suction to the rear surfaces of the impeller blades 14 to thereby increase the torque supplied to the impeller disc 10, with the appropriate valve configuration, hole 18 could also serve to supply forced compressed air. Accordingly, the control valve supplying air to the rear surface of the impeller blades 14 provides additional torque, either positive or negative, to match the wheel speed more precisely to the ground speed.

A prerotation system according to the preferred embodiments has, for example, an impeller disc 10 with five blades, each with a 0.065 square foot area. When provided with such a blade structure, the system will generate approximately three quarters horsepower. This power is sufficient to prerotate a 200 pound wheel three feet in diameter to a tangential speed of 100 knots. The combination of impeller blades 14 and controlled air stream are essentially an air motor. However, according to two other preferred embodiments, the air motor is replaced with electric or hydraulic motors, either of which are commercially available. Under the second and third preferred embodiments, the electric or hydraulic motors are controlled by the same type of signals generated by the microprocessor 35 in the first preferred embodiment.

In operation, when the landing gear 2 is lowered as the plane approaches the runway for landing, the wheels 4 are prerotated to a desired rotation per minute, for example, to an RPM that provides a tangential velocity equivalent to the landing speed, by the action of three separate prerotation sources. First, the action of external vacuum system 20 draws air into inlet hole 18 so as to create an exiting stream of air which contacts blades 14. Thus, a torque is created which causes disc 10 and thus wheel rim 8 to rotate in the direction corresponding to the forward movement of the wheel of the airplane when it lands. Second, the air stream directed into the interior of housing 12 through outlet 16 is confined within housing 12 due to its shape and close proximity to disc 10. Therefore, as air is directed against blades 14, disc 10 and wheel rim 8 are rotated in the same direction as the rotation due to the vacuum source. The first two prerotation sources may be initiated before the landing gear is extended.

Finally, a third rotational force is developed when the landing gear is in the extended position. Since the upper half of impeller disc 10 is covered by housing 12, only the lower half of the blades 14 are impacted upon by the passing air stream as the airplane moves through the air. Thus, a third torque is created as the air contacts the exposed blades, tending to cause impeller disc 10 and wheel rim 8 to rotate in the desired direction.

The references discussed in the Background Of The Invention are hereby incorporated by reference.

This invention has been described in detail in connection with the preferred embodiments. These embodiments, however, are merely for example only and the invention is not restricted thereto. It will be understood by those skilled in the art that other variations and modifications can easily be made within the scope of this invention as defined by the appended claims.

I claim:

1. A prerotation device for an aircraft wheel, said device comprising:
   an impeller disc fixed to a rim of said aircraft wheel, said impeller disc including a plurality of blades projecting therefrom;
   a housing disposed over the surface of said impeller disc opposite said rim, said housing having at least a first hole therein, said housing allowing at least some of said blades to be acted upon by ambient air to provide a first means for rotating said aircraft wheel;

a vacuum means for forcing a stream of air into said at least one hole for providing a second means for rotating said wheel, said stream of air impacting on said blades before entering said hole to cause said impeller disc to rotate, thereby rotating said wheel;

sensing means for sensing the rotational speed of said aircraft wheels and for sensing the ground speed of said aircraft and for generating speed signals representative of each of said speeds;

control valve means for controlling the amount of air in said vacuum means based on said aircraft wheel rotational speed and said ground speed of said aircraft; and microprocessing means for accepting rotational speed and ground speed signals from said sensing means and for issuing control signals to said control valve means based on said rotational speed signal and said ground speed signal.

2. The device recited in claim 1, said housing covering only approximately an upper half of said impeller disc such that only about one half of said blades are covered by said housing, the other half of said blades exposed to the passing air when said wheel is lowered.

3. The device recited in claim 2, said housing having a generally semicircular shape.

4. The device recited in claim 2, said housing including a second hole disposed at a diametrically opposite side from said first hole, said device further comprising a forced air means for providing a forced air stream out of said second hole, said forced air stream impacting on said blades to cause said impeller disc to rotate in the same direction of rotation as the rotation due to said vacuum means.

5. The device recited in claim 4, said blades disposed at equiangular locations around the perimeter of said disc and having a semi-circular shape.

6. The device recited in claim 5, said housing supported on a wheel strut.

7. The device recited in claim 1, said housing including a second hole disposed at a diametrically opposite side from said first hole, said device further comprising a forced air means for providing a forced air stream out of said second hole, said forced air stream impacting on said blades to cause said impeller disc to rotate in the same direction of rotation as the rotation due to said vacuum means.

8. The combination of an aircraft and a prerotation device for the wheels of said aircraft, said device comprising:

an impeller disc fixed to the rim of each wheel of said aircraft, said impeller disc including a plurality of blades projecting therefrom;

a housing disposed over the surface of said impeller disc opposite said rim, said housing having at least a first hole therein, said housing allowing at least some of said blades to be acted upon by ambient air to provide a first means for rotating said aircraft wheel;

a vacuum means for forcing a stream of air into said at least one hole for providing a second means for rotating said wheel, said stream of air impacting on said blades before entering said hole to cause said impeller disc to rotate, thereby rotating said wheel;

sensing means for sensing the rotational speed of said aircraft wheels and a means for sensing the ground speed of said aircraft;

signal generating means for generating a speed signal representative of each of said rotational speed and ground speed;

control valve means for controlling the amount of air in said vacuum means based on said aircraft wheel rotational speed and said ground speed of said aircraft; and microprocessing means for accepting rotational speed and ground speed signals and for issuing control signals to said control valve means based on said rotational speed signal and said ground speed signal.

9. The device recited in claim 8, said housing covering approximately an upper half of said impeller disc such that only about one half of said blades are covered by said housing, the other half of said blades exposed to the passing air when said wheels are lowered.

10. The device recited in claim 8, one said prerotation device disposed adjacent each wheel of said aircraft.

11. The device recited in claim 10, said housing including a second hole disposed at a diametrical opposite side from said first hole, said device further comprising a forced air means for providing a forced air stream out of said second hole, said forced air stream impacting on said blades to cause said impeller disc to rotate in the same direction of rotation as the rotation due to said vacuum means.

12. The device recited in claim 11, said blades disposed at equiangular locations around the perimeter of said disc and having a rounded shape.

13. The device recited in claim 11, said housing supported on a wheel strut.

14. The device recited in claim 8, said housing having a generally semicircular shape.

15. The device recited in claim 8, said housing including a second hole disposed at a diametrically opposite side from said first hole, said device further comprising a forced air means for providing a forced air stream out of said second hole, said forced air stream impacting on said blades to cause said impeller disc to rotate in the same direction of rotation as the rotation due to said vacuum means.

16. A method for prerotating the wheels of an aircraft said wheels each comprising a rim and having an impeller disc fixed to said rim, said impeller disc including a plurality of blades projecting therefrom, a housing disposed over said impeller disc, said housing having at least a first hole therein, said method comprising the steps of:

providing a stream of ambient air to strike at least some of said blades and thereby provide a first means for rotation for said aircraft wheel;

creating a vacuum in an air path to force a stream of air into said hole such that said air stream impacts on said blades creating a torque to thereby provide a second means of rotation for said aircraft wheel;

sensing the rotational speed of said aircraft wheels, sensing the ground speed of said aircraft, and generating speed signals representative of each of said speeds;

controlling the flow of air into said first hole by opening and closing a control valve disposed in said vacuum air path;

receiving the rotational speed signals and ground speed signals in a microprocessor and issuing control signals to said control valve means based on said rotational speed signal and said ground speed signal.

17. The method recited in claim 16 further comprising the step of providing a second stream of air into said housing through a second hole, said second stream impacting on said blades to create a further additive torque.

18. The method recited in claim 17, said step of providing a second stream of air further comprises the step of controlling the flow of air out of said second hole by opening and closing a control valve disposed in said second air stream.

19. A prerotation device for an aircraft wheel, said device comprising:

an impeller disc fixed to a rim of said aircraft wheel, said impeller disc including a plurality of blades projecting therefrom;

a housing disposed over said impeller disc and covering a portion of said blades, said housing having a semi-circular shape and covering approximately half of the surface area of said disc, said blades disposed equiangularly about the perimeter of said disc, said housing covering about one half of said blades and essentially isolating said covered blades from the exterior air flow, the other half of said blades exposed to the passing ambient air to provide a first means for rotating said aircraft wheel, said housing having at least one hole therein;

a forced air means for providing a stream of force air into said housing through said hole, said forced air impacting on said blades, thereby providing a second means causing rotation of said disc and said wheel to which said disc is fixed;

means for sensing the rotational speed of said aircraft wheels and means for sensing the ground speed of said aircraft;

signal generating means for generating a speed signal representative of each of said rotational speed and ground speed;

control valve means for controlling the amount of air in said forced air means based on said aircraft wheel rotational speed and said ground speed of said aircraft; and microprocessing means for accepting rotational speed and ground speed signals and for issuing control signals to said control valve means based on said rotational speed signal and said ground speed signal.

* * * * *